United States Patent [19]

Cayn et al.

[11] 4,322,068
[45] Mar. 30, 1982

[54] RECEIVING HOPPER FOR DOCUMENTS

[75] Inventors: Henri P. M. Cayn, les Ponts de Ce; Claude J. Donabin, Angers, both of France

[73] Assignee: Compangie Internationale pour l'Informatique Cii-Honeywell Bull (Societe Anonyme), Paris, France

[21] Appl. No.: 792,209

[22] Filed: Apr. 29, 1977

[30] Foreign Application Priority Data

Apr. 29, 1976 [FR] France ................................ 76 12764

[51] Int. Cl.³ ...................... B65H 31/02; B65H 29/13
[52] U.S. Cl. .................................... 271/207; 271/185; 271/198
[58] Field of Search ............... 271/207, 185, 184, 177, 271/174, 63, 80, 208–211, 213–224, 198, 180, 188, 225, 278, 314; 193/46, 47, 48; 214/6 D, 1 M; 209/DIG. 1, 900; 198/417; 414/69, 97

[56] References Cited

U.S. PATENT DOCUMENTS

| | | | |
|---|---|---|---|
| 2,770,192 | 11/1956 | Mitchell et al. | 271/207 X |
| 3,220,569 | 11/1965 | Willits et al. | 271/185 X |
| 3,532,337 | 10/1970 | Kratz | 271/185 X |
| 3,918,703 | 11/1975 | Mand et al. | 271/185 |

FOREIGN PATENT DOCUMENTS 625436  9/1961  Italy ..................................... 271/198

Primary Examiner—Bruce H. Stoner, Jr.
Attorney, Agent, or Firm—Edward J. Kondracki

[57] ABSTRACT

A hopper for receiving documents and stacking documents flat wherein the documents are fed on edge along a document feeding track which terminates tangentially to a vertical back plate of the hopper includes a first guide means which moves the upper edge of a document, which enters the hopper parallel to the plate, away from the plate, and a second guide means for guiding the lower edge of the document while holding it on the same course until the document reaches a position where it drops into the hopper by tilting about its lower edge. The hopper includes a tilting ramp which is attached to the vertical back plate at a level substantially lower than that of the upper edge of a document entering the hopper. The ramp moves the upper edge of the document away from the plate as the document is introduced into the hopper. A retainer guide, which is also attached to the back plate, guides the lower edge of the document while holding it close to the plate until the document tilts about its lower edge to fall flat into the receptacle.

16 Claims, 5 Drawing Figures

U.S. Patent  Mar. 30, 1982  Sheet 1 of 2  4,322,068
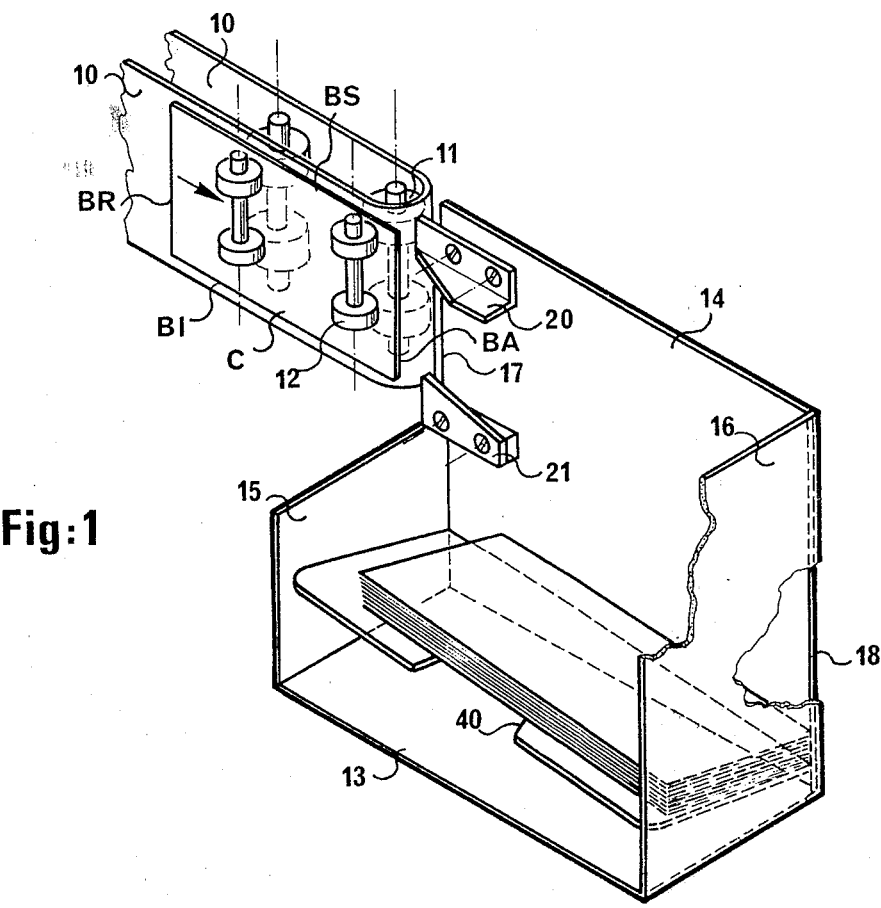
Fig:1
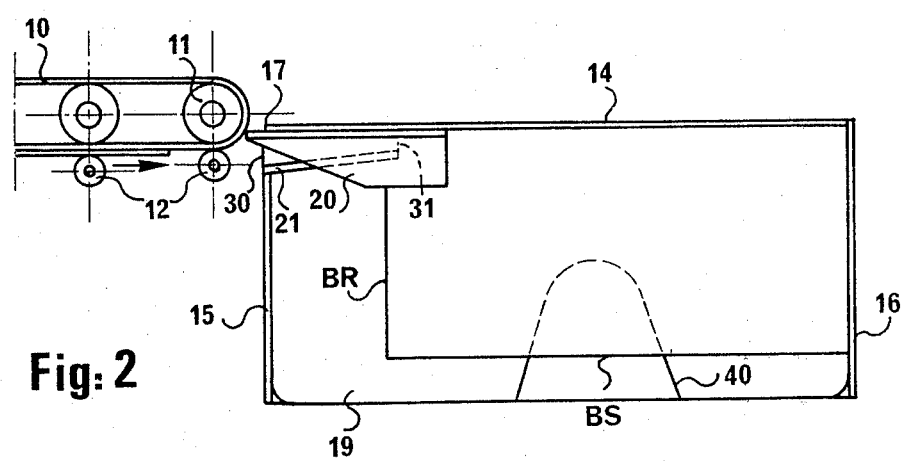
Fig:2

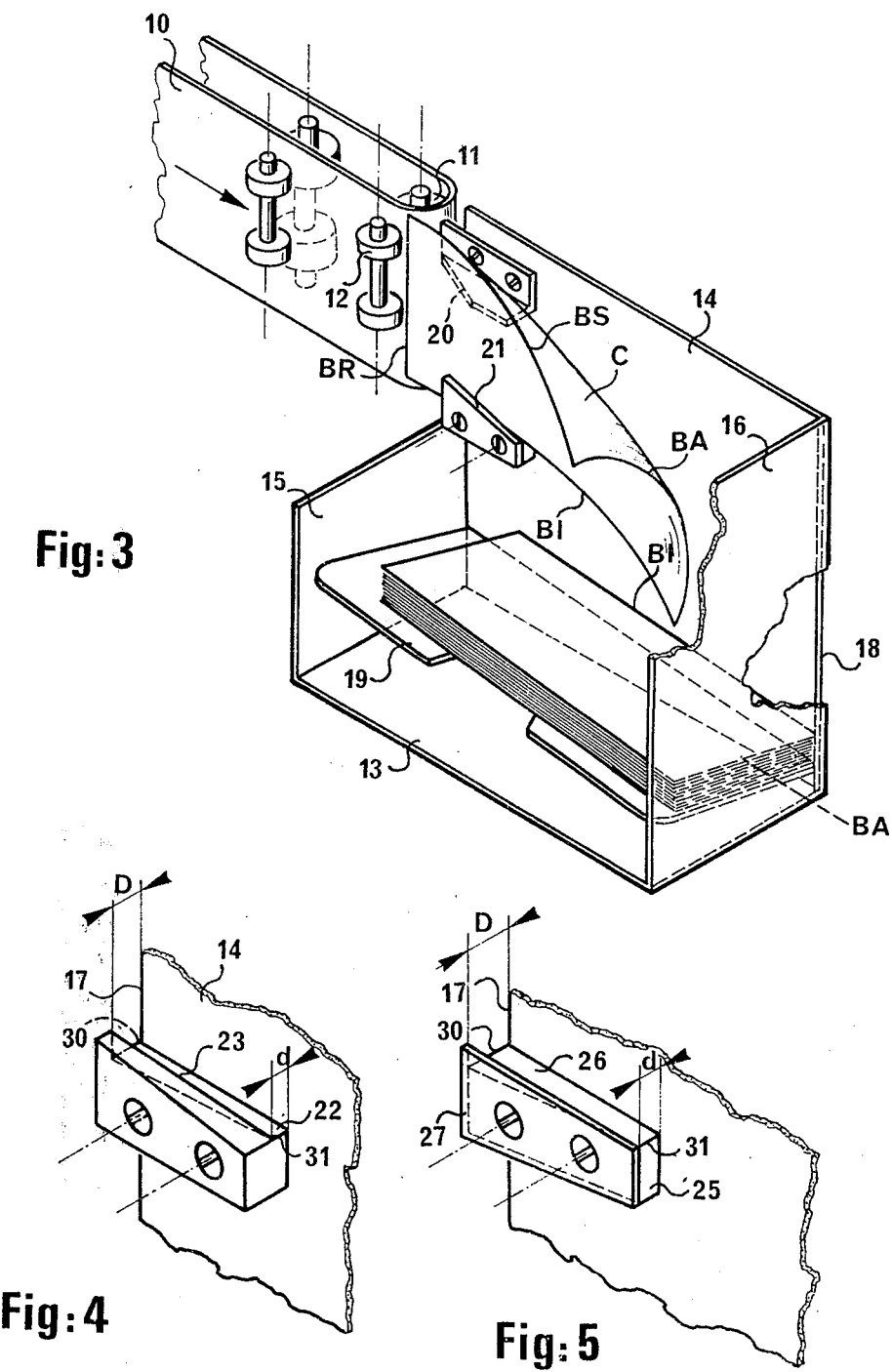

RECEIVING HOPPER FOR DOCUMENTS

BACKGROUND OF THE INVENTION

1. Field of the Invention

The present invention relates to a receiving hopper or stacker for documents which is adapted to stack documents flat after they have been fed on edge along a document feedtrack.

2. Description of the Prior Art

In document handling machines, the documents, initially placed in a supply magazine, are extracted from the magazine one-by-one, are conveyed along a track consisting of rotary feed rollers and conveying bands, belts or endless chains, and are finally deposited in a receiving hopper. To allow the documents to be processed, the track is provided with functional members which perform recognized functions such as, for example, analyzing the markings carried by the documents, checking printed data, or apply fresh data. The number and nature of the functional members on the track vary depending upon the type of machine concerned.

In cases where the documents which are moved along the track also need to be visible to the operator, either to enable the reading of written data carried by the documents, or again to check certain markings made under the control of a keyboard operated by the operator, it has been found advantageous to arrange the track in such a way that it offers maximum visibility to the operator, that is to say it is arranged almost vertically, the documents on the track being then fed along on edge parallel to their length. As an example, a handling machine in which the track is so arranged is described in particular in U.S. Pat. No. 3,285,500. In this machine, the documents, after having been processed, are ejected into the receiving hopper where they are then stacked on edge, the stacking being performed by means of a suitable mechanism which pushes back the pack formed by documents which have already accumulated in order to make room for each document as it arrives in the hopper. However, this procedure is not entirely satisfactory in that, when the number of documents stacked in the hopper becomes relatively large, the pack so formed cannot comfortably be taken hold of in the hand and, this being the case, there is a danger that the operator, when he takes the pack out of the hopper will be unable to keep hold of it and will thus spill the documents over the ground.

To overcome this disadvantage, document stacking arrangements have been proposed, of a type similar to that which is, for example, described in U.S. Pat. No. 3,137,499, in which each document is fed on edge along a track and, after being diverted from its course in order to be fed to a receiving hopper, is introduced into a curved deflecting member where it is subjected to a turning motion so that it is in a substantially horizontal position at the time when it enters the hopper. An arrangement of this kind thus enables a pack of documents to be obtained which, since they are resting flat in the receptacle, can easily be taken hold of by the operator. However, the arrangement has proved expensive to construct in that, not only does the deflecting member have to be very carefully made by reason of its special shape, but it also has to be provided with additional and correctly orientated feed rollers so that each document introduced into the selecting member can be moved forward. In addition, because of the rubbing to which each document is subjected in the course of its passage through the deflecting member, the arrangement is often the cause particularly troublesome electrostatic effects which upset the operation of the machines into which the documents are subsequently introduced. These effects are all the more pronounced in that the documents are, in general, not very stiff and usually consist of punched cards, cheques, invoices and similar documents.

SUMMARY OF THE INVENTION

The present invention seeks to overcome all these disadvantages and provides a receiving hopper adapted to stack documents which have been fed on edge along a feed track in a flat arrangement one atop the other and is principally characterized by the extreme simplicity of its construction and by the absence of moving mechanical parts, which enables its manufacturing cost to be greatly reduced. Moreover, in comparison with existing arrangements of a similar nature, the hopper has the advantage that it causes the documents to be properly stacked without thereby causing them to become electrically charged in an undesirable fashion.

The invention is embodied in a receiving hopper for documents which is bounded by at least one vertical lateral plate and which is adapted to stack documents flat after they have been fed on edge along a document feed track which terminates tangentially to the said lateral plate. The hopper includes a first guide means which moves the upper edge of the document away from the lateral plate as it arrives in the hopper parallel to the plate, and a second means for guiding the lower edge of the document whilst maintaining it until the document reaches a position where it is able to drop into the receptacle by tilting about its lower edge.

BRIEF DESCRIPTION OF THE DRAWINGS

The invention will now be further described by way of example, with reference to the accompanying drawings, in which:

FIG. 1 is a perspective view of one embodiment of a document receiving hopper constructed in accordance with the invention;

FIG. 2 is a plan view of the receiving hopper shown in FIG. 1;

FIG. 3 is a perspective view of the receiving hopper shown in FIG. 1 illustrating the change in orientation which occurs to a document as it arrives in the hopper, FIG. 4 is a perspective view showing a first embodiment of a retainer guide which can be used in a receiving hopper constructed in accordance with the invention, and FIG. 5 is a perspective view showing a second embodiment of retainer guide which can be used in a receiving hopper constructed in accordance with the invention.

DESCRIPTION OF THE PREFERRED EMBODIMENT

Referring now to the drawings, the document receiving hopper shown in FIGS. 1, 2 and 3 forms part of a document handling machine of conventional type which is not shown in the drawings, because it does not form part of the invention. In a known fashion, the documents placed in the machine, after having been processed, are propelled towards a receiving hopper along a document feed track which is formed in general by sets of rotary rollers and conveying belts, bands or endless chains. In this embodiment, it will be assumed that the track is formed by an endless belt 10 which is tensioned between two rollers, one of which, roller 11, is shown in FIGS. 1 to 3. The two rollers are so positioned that their axes are vertical. This being the case, the documents are pressed against the belt 10 by means of pressure wheels 12 and are fed along an edge when one of the rollers is caused to rotate by a known drive means, such as an electric motor, for example. The direction of movement of the documents is that indicated by the arrow in FIGS. 1 and 3, each document then having as shown in FIG. 1, a front edge BA, a rear edge BR, an upper edge BS and a lower edge BI.

The document receiving hopper which is shown in FIGS. 1 to 3 consists in essence of a horizontally arranged base plate 13 at whose edges are mounted vertical back plate 14 and two vertical end-plates 15 and 16. The plates 15 and 16 are also attached by one of their vertical edges to respective vertical edges 17 and 18 of the back plate 14. The hopper is also provided with a partition 19 on which the documents, which finally fall into the hopper after having been fed along by the endless belt 10, stack up in a flat pile. As can be seen in FIGS. 1 and 3, this partition 19 is inclined with respect to the horizontal towards the vertical edge 18 of the back plate 14, so that the documents which stack up on the partition 19 will be drawn by gravity towards the back plate 14 and the end-plate 16 and will thus rest by their lower edges BI and front edges BA against these two plates, as shown in FIG. 3.

It should be mentioned here that the documents may be punched cards, cheques, invoices or similar documents and that, this being the case, the documents which build up on the partition 19 may be of different lengths, provided, however, that their length is between L and 3L/2, L being the length of the shortest document which the hopper is intended to receive. In the embodiment being described, the length of the documents which the hopper is able to receive is preferably, between 150 and 225 mm. It is also possible to establish a mean length for the documents, this mean length being given by the equation:

$$Lm = L + (3L/2 - L)/2$$

that is to say by:

$$LM = 5L/4$$

In the preferred example being described, this mean length is thus equal to (5×150)/4 mm, i.e., substantially 187 mm.

As shown in FIGS. 1 to 3, the endless belt 10 is situated to the left or input end of the receiving hopper, so that the documents which are fed along by the belt pass in front of the vertical edge 17 of the back plate 14 at the moment when they enter the hopper. The endless belt 10 is so arranged as to cause each of the documents to arrive tangentially to the plane of the plate 14, as is shown more particularly in FIG. 2.

Also, as can be seen in FIGS. 1 to 3, the receiving hopper which has just been described includes a tilting ramp 20 which is attached to the back plate 14 at a level substantially below that of the upper edge BS of a document entering the hopper, and a retainer guide 21 which is also attached to plate 14 but at a point below the tilting ramp 20. In the embodiment shown in FIG. 4, the retainer guide is formed by a single part of which the upper face is machined to have a plane horizontal surface 22 bounded by a lip 23. This part is positioned against the back plate 14 in such a way that surface 22 is situated adjoining plate 14 at a level lower than that of the lower edge BI (FIG. 1) of a document entering the hopper, with the result that the gap left between lip 23 and the back plate 14 forms a guiding passage for the lower edge BI. As can be seen in in FIGS. 2 and 4, the guiding passage extends across the back plate 14 between an end 30 which is situated flush with the vertical edge 17 of the plate and an end 31 which would be situated substantially perpendicularly above the rear edge BR of documents of the mean length building up on the partition 19, these documents being assumed to be aligned by their front edges BA and lower edges BI against the end plate 16 and back plate 14. The lip is tapered and has its greatest dimension or height at end 30, the height gradually reducing to zero, that is the end of lip 23 is flush with the surface 22. It should also be noted as shown in FIG. 4 that the width of the lip at end 30 is narrower than the width at end 31, the surface of the lip thus being trapezoidal in shape.

In the embodiment shown in FIG. 5, the retainer guide is formed by a support member 25 in the shape of a right prism having a trapezoidal base. This support member 25 is attached to the back plate 14 in such a way that its trapezoidal faces are in a horizontal position and in such a way that its upper trapezoidal face 26 lines up at a lower level than the lower edge BI of a document entering the hopper. A guiding member 27 is attached to the support member 25 to form a lip against face 26, the gap left between this lip and the back plate 14 forming a guide passage for the lower edge, which decreases in width along the length of face 26 from end 30 to end 31.

To this end, the support member 25 is so formed that, as can be seen in FIG. 2, the larger of the two parallel sides of the upper trapezoidal face 26, that is to say side 30, lies flush with the vertical edge 17 of the back plate 14 while the smaller of the two sides, that is to say side 31, would lie substantially perpendicularly above the rear edges BR of documents of the mean length building up on partition 19, these documents being assumed to be aligned by plates 14 and 16. It should also be mentioned that, in the example described, the angle formed by the non-parallel sides of the upper trapezoidal face 26 is less than 5°.

Referring to FIGS. 4 and 5, it can also be seen that, whichever form the retainer guide takes, the width D of the guiding passage at end 30 is greater than its width d at the other end 31, this width d being slightly greater than the thickness of a document. Also, the height of the lip diminishes as the guiding passage narrows, its height becoming virtually zero at end 31 of the passage.

The object of these provisions is, on the one hand, to facilitate the engagement in the guiding passage of the lower edge BI of a document which is fed along by the endless belt 10 and enters the receiving hopper and on the other hand to hold this lower edge BI close to the back plate 14, until as will be seen below, the document tilts abouts its lower edge to fall flat in the hopper. In addition, the said provisions prevent the document from becoming caught against the lip as it tilts. In the example described, in which the documents fed into the hopper are formed by checks the thickness of which is approximately 1/10th of a millimeter, the width of the guiding passage at its end 30 can be stated to be of the order of 1 to 2 millimeters while its width at end 31 is approximately a quarter of a millimeter.

FIGS. 1 to 3 also show that the tilting ramp 20 forms an acute angle with the plane of back plate 14 the apex of which angle is situated close to the endless belt 10. The result is that, when a document such as that indicated by reference C in FIG. 1 is fed by the endless belt 10 to the receiving hopper just described, the lower edge BI of the document is engaged in the guiding passage of the retainer guide 21 while its upper edge BS slides across the ramp 20 and is deflected away from the back plate 14 as the document advances into the hopper. The document thus tilts about its lower edge BI, as shown in FIG. 3, which edge moves only very slightly away from the back plate 14, even after it has left the guiding passage. Because of this, the front edge BA of the document tends to assume a horizontal position. It can be seen that, in the position shown in FIG. 3, the document C is no longer being fed along by the endless belt 10. However, the feeding speed of the belt is such that the document, at the time when it leaves the belt 10, will continue to move as a result of the kinetic energy which it has acquired. This being the case, when the lower edge BI of the document moves clear of the guiding passage, the document is in a position substantially parallel to the partition 19 and, as it drops into the hopper, it comes to rest flat on documents already stacked on the partition and as it does so is aligned by its front edge BA against the end plate 16 and by its lower edge BI against the back plate 14.

It can also be seen, by referring to FIGS. 1 to 3, that the partition 19 contains a cutout 40 which make it easier for an operator to take hold of a pack of documents which has built up on the partition.

It should also be mentioned that, because the documents which are fed into the receiving hopper just described are subjected to twisting to make them fall flat in the receptacle, the area of the documents which is subject to friction is extremely small and the effects of electrostatic phenomena are thus virtually eliminated.

We claim:

1. A hopper for receiving documents fed from an output of a feeding track in a vertical orientation and for stacking the documents in a flat arrangement one atop the other comprising the combination of: at least one vertical boundary plate aligned parallel to the plane of the feeding track and having a first edge in close proximity to the output thereof such that the documents are fed parallel to that plate, first guide means supported on said vertical plate for progressively spacing the upper part of a document fed into the hopper away from the vertical plate, and second guide means supported on said vertical plate, said second guide means including a guiding passage on its upper face which is bounded by a lip and which is disposed at a level lower than that of the lower edge of a document fed into the hopper, said guiding passage extending on part of the breadth of the vertical back plate between a first end situated flush with said first edge of the vertical plate and a second end situated substantially perpendicularly above the rear edges of documents of mean length building up in the hopper, to enable the lower edge of a document entering the hopper to be guided and progressively moved closer to said vertical plate as that document is fed into the hopper, so as to cause that document as it is fed to tilt about its lower edge such that successive fed documents are stacked in flat arrangement.

2. A receiving hopper according to claim 1 wherein said vertical plate includes a second edge and said hopper is also bounded by a bottom plate and a vertical end-plate attached to the second edge of said vertical back plate and disposed perpendicularly to the said plate, and said hopper further includes a partition spaced from said bottom plate of said hopper and inclined with respect to the horizontal towards said second edge to enable the documents to be stacked flat on said partition and to be drawn towards the said vertical back plate and end-plate by gravity, each of the fed documents being thus aligned by its front fed edge against the end plate and by its lower fed edge against the said vertical back plate, said partition is also inclined with respect to the horizontal towards said vertical back plate.

3. A receiving hopper according to claim 1, wherein the guiding passage is wider at its first end than at its second end.

4. A receiving hopper according to claim 3, wherein said guiding passage progressively narrows from the first to the second end and the height of the lip of the guiding passage diminishes as the passage narrows.

5. A receiving hopper according to claim 3 wherein the second means includes a support member in the shape of a right prism having a trapezoidal base, said base being attached to the vertical back plate such that its upper trapezoidal face is disposed at a level lower than that of the lower edge of a document entering the hopper, the larger of the two parallel sides of said upper face lying flush with the first vertical edge of the vertical back plate and the smaller of these two sides lying substantially perpendicular above the rear edges of documents of mean length building up in the receptacle, and a guide member attached to the said support member to form a lip against said upper face.

6. A receiving hopper according to claim 5, wherein the height of the lip formed against the upper face of the upper member diminishes uniformly as the distance between the guide member and the vertical plate decreases.

7. A receiving hopper according to claim 6 wherein the angle formed by the non-parallel sides of the upper trapezoidal face of the support is less than 5°.

8. A receiving hopper according to claim 5, wherein the angle formed by the non-parallel sides of the upper trapezoidal face of the support member is less than 5°.

9. In a hopper for receiving documents wherein said hopper is bounded by at least one vertical back plate having a first vertical edge and adapted to stack documents flat which are fed along a document feeding track which terminates in a plane parallel to and in close proximity to the said vertical back plate at the said first vertical edge, the improvement comprising first tilting ramp means attached to the said vertical back plate at a level substantially lower than that of the upper edge of a document entering the hopper for causing the said upper edge of a document to move progressively away from the vertical plate as the said document is introduced, and second retainer guide means attached to the said plate for guiding the lower edge of the document while holding it close to the plate until the document tilts about its lower edge to fall flat into the receptacle, said tilting ramp means and said retainer guide means extending a short distance along said vertical plate, said vertical plate including a second edge and said hopper being bounded by a bottom plate and a vertical end-plate attached to the second edge of said vertical back plate and disposed perpendicularly to the said plate, and said hopper further including a partition spaced from said bottom plate of said hopper and inclined with respect to the horizontal towards said second edge to enable the documents to be stacked flat on said partition and to be drawn towards the said vertical back plate and end-plate by gravity, each of the fed documents being thus aligned by its front fed edge against the end plate and by its lower fed edge against the said vertical back plate, said partition is also inclined with respect to the horizontal towards said vertical back plate.

10. In a hopper for receiving documents wherein said hopper is bounded by at least one vertical back plate having a first vertical edge and adapted to stack documents flat which are fed along a document feeding track which terminates in a plane parallel to and in close proximity to the said vertical back plate at the said first vertical edge, the improvement comprising first tilting ramp means attached to the said vertical back plate at a level substantially lower than that of the upper edge of a document entering the hopper for causing the said upper edge of a document to move progressively away from the vertical plate as the said document is introduced, and second retainer guide means attached to the said plate for guiding the lower edge of the document while holding it close to the plate until the document tilts about its lower edge to fall flat into the receptacle, said tilting ramp means and said retainer guide means extending a short distance along said vertical plate, the second means including a guiding passage on its upper face which is bounded by a lip and which is disposed at a level lower than that of the lower edge of a document entering the hopper, said guiding passage extending across the vertical back plate between a first end situated flush with the first vertical edge of the plate and a second end situated substantially perpendicularly above the rear edges of documents of mean length stacking up on the partition in the hopper.

11. A receiving hopper according to claim 10, wherein the guiding passage is wider at its first end than at its second end.

12. A receiving hopper according to claim 10, wherein said guiding passage progressively narrows from the first to the second end and the height of the lip of the guiding passage diminishes as the passage narrows.

13. In a hopper for receiving documents wherein said hopper is bounded by at least one vertical back plate having a first vertical edge and adapted to stack documents flat which are fed along a document feeding track which terminates in a plane parallel to and in close proximity to the said vertical back plate at the said first vertical edge, the improvement, comprising first tilting ramp means attached to the said vertical back plate at a level substantially lower than that of the upper edge of a document entering the hopper for causing the said upper edge of a document to move progressively away from the vertical plate as the said document is introduced, and second retainer guide means attached to the said plate for guiding the lower edge of the document while holding it close to the plate until the document tilts about its lower edge to fall flat into the receptacle, said tilting ramp means and said retainer guide means extending a short distance along said vertical plate, the second means including a support member in the shape of a right prism having a trapezoidal base, said base being attached to the vertical back plate such that its upper trapezoidal face is disposed at a level lower than that of the lower edge of a document entering the hopper, the larger of the two parallel sides of said upper face lying flush with the first vertical edge of the vertical back plate and the smaller of these two sides lying substantially perpendicular above the rear ends of documents of mean length building up in the receptacle, and a guide member attached to the said support member to form a lip against said upper face.

14. A receiving hopper according to claim 13, wherein the height of the lip formed against the upper face of the upper member diminished uniformly as the distance between the guide member and the vertical plate decreases.

15. A receiving hopper according to claim 14 wherein the angle formed by the non-parallel sides of the upper trapezoidal face of the support member is less than 5°.

16. A receiving hopper according to claim 13, wherein the angle formed by the non-parallel sides of the upper trapezoidal face of the support member is less than 5°.

* * * * *

UNITED STATES PATENT AND TRADEMARK OFFICE
CERTIFICATE OF CORRECTION

PATENT NO. : 4,322,068
DATED : March 13, 1982
INVENTOR(S) : CAYN et al

It is certified that error appears in the above-identified patent and that said Letters Patent are hereby corrected as shown below:

In claim 4, column 6, line 20, the designation "claim 3" should be --claim 1--.

In claim 5, column 6, line 24, the designation "claim 3" should be --claim 1--.

Signed and Sealed this

Fourteenth Day of September 1982

[SEAL]

Attest:

GERALD J. MOSSINGHOFF

Attesting Officer

Commissioner of Patents and Trademarks